United States Patent [19]

Shimizu

[11] Patent Number: 5,475,684
[45] Date of Patent: Dec. 12, 1995

[54] TIME-DIVISION MULTIPLEX COMMUNICATION TRANSMISSION APPARATUS

[75] Inventor: Hiroyuki Shimizu, Tokyo, Japan

[73] Assignee: NEC Corporation, Japan

[21] Appl. No.: 186,274

[22] Filed: Jan. 25, 1994

[51] Int. Cl.⁶ ..................................................... H04J 3/00
[52] U.S. Cl. ........................ 370/77; 370/105.4; 375/362; 375/309
[58] Field of Search .................................. 370/77, 100.1, 370/103, 104.1, 105, 105.1, 105.2, 105.3, 105.4, 95.1, 95.3; 375/354, 359, 362, 368, 296, 315, 309, 314; 455/116, 126, 127

[56] References Cited

U.S. PATENT DOCUMENTS

| | | | |
|---|---|---|---|
| 4,313,198 | 1/1982 | Mazzocchi | 370/100.1 |
| 4,485,478 | 11/1984 | Takada | 375/296 |
| 4,979,192 | 12/1990 | Shimizume et al. | 375/362 |

FOREIGN PATENT DOCUMENTS

| | | |
|---|---|---|
| 0075601 | 4/1982 | European Pat. Off. . |
| 0066839 | 6/1982 | European Pat. Off. . |
| 0156398 | 3/1985 | European Pat. Off. . |
| 0247607 | 5/1987 | European Pat. Off. . |

*Primary Examiner*—Douglas W. Olms
*Assistant Examiner*—Huy D. Vu
*Attorney, Agent, or Firm*—Ostrolenk, Faber, Gerb & Soffen

[57] ABSTRACT

A time-division multiplex communication transmission apparatus includes a logic processing circuit, a digital filter, a modulation circuit, and a high-frequency amplification unit. The logic processing circuit performs logic processing of input burst data and outputs a burst timing signal for each time slot for time-division transmission. The digital filter converts output data from the logic processing circuit into baseband data for modulation. The digital filter is reset at a time slot boundary when no burst data signal is present in an adjacent time slot. The modulation circuit modulates an output signal from the digital filter. The high-frequency amplification unit performs burst waveform processing of an output signal from the modulation circuit on the basis of a burst timing signal from the logic processing circuit.

7 Claims, 8 Drawing Sheets

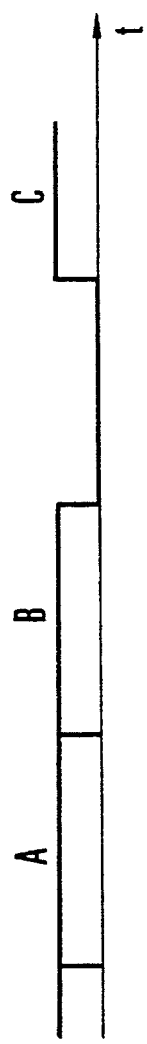
FIG. 2A BURST DATA SIGNAL 123
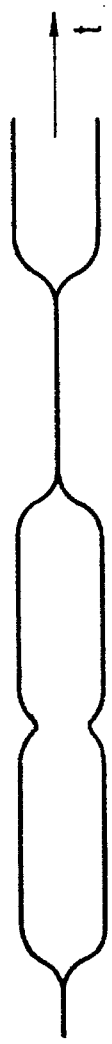
FIG. 2B HIGH-FREQUENCY OUTPUT SIGNAL 124
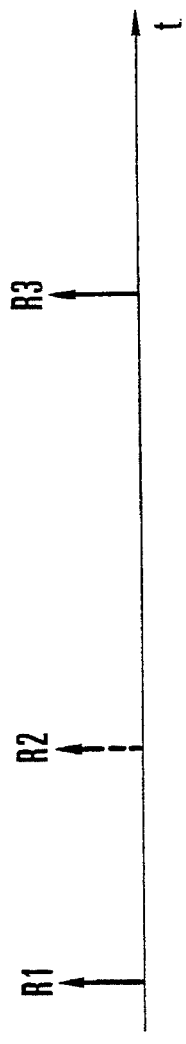
FIG. 2C RESET SIGNAL 120

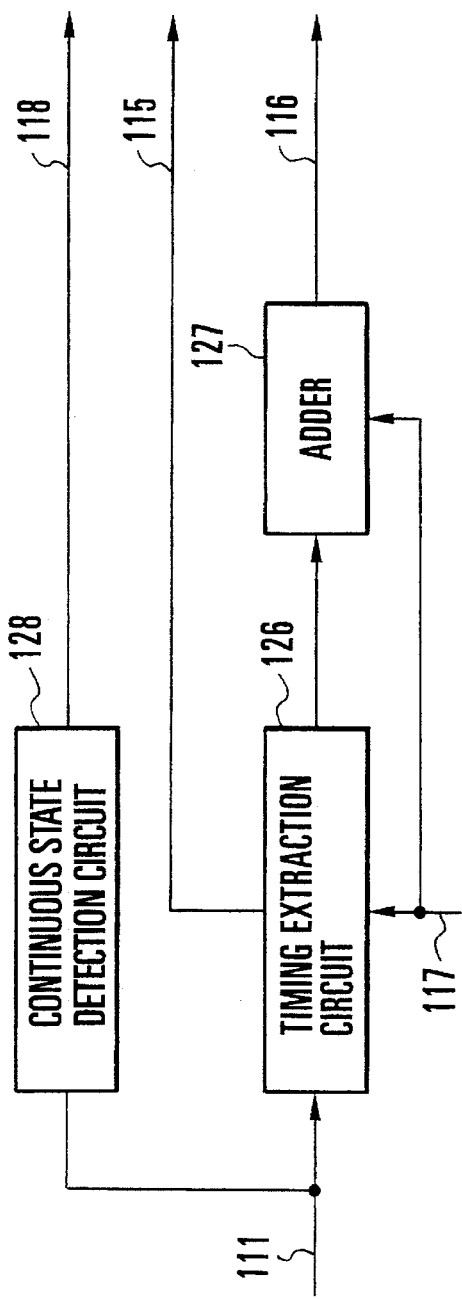
FIG. 3
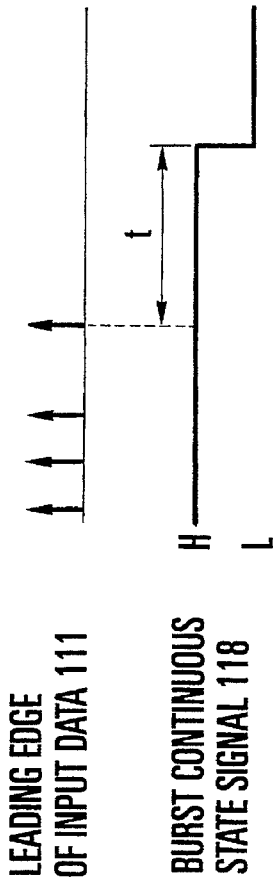
FIG. 4A    INPUT DATA 111
FIG. 4B    LEADING EDGE
           OF INPUT DATA 111
FIG. 4C    BURST CONTINUOUS
           STATE SIGNAL 118

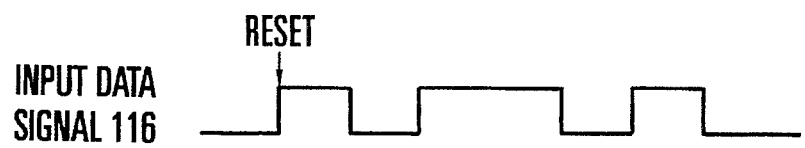
FIG. 8A INPUT DATA SIGNAL 116
FIG. 8B OUTPUT FROM DIGITAL FILTER 121
FIG. 8C INPUT DATA SIGNAL 116
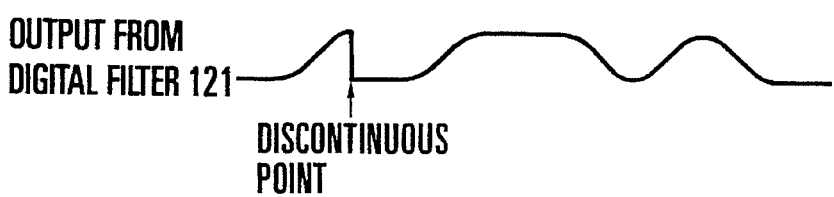
FIG. 8D OUTPUT FROM DIGITAL FILTER 121
FIG. 9A INPUT DATA SIGNAL 116
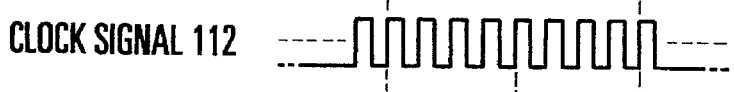
FIG. 9B CLOCK SIGNAL 112
FIG. 9C FREQUENCY-DIVIDED SIGNAL 125
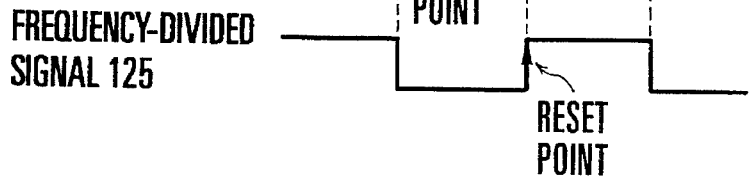
FIG. 9D FREQUENCY-DIVIDED SIGNAL 125

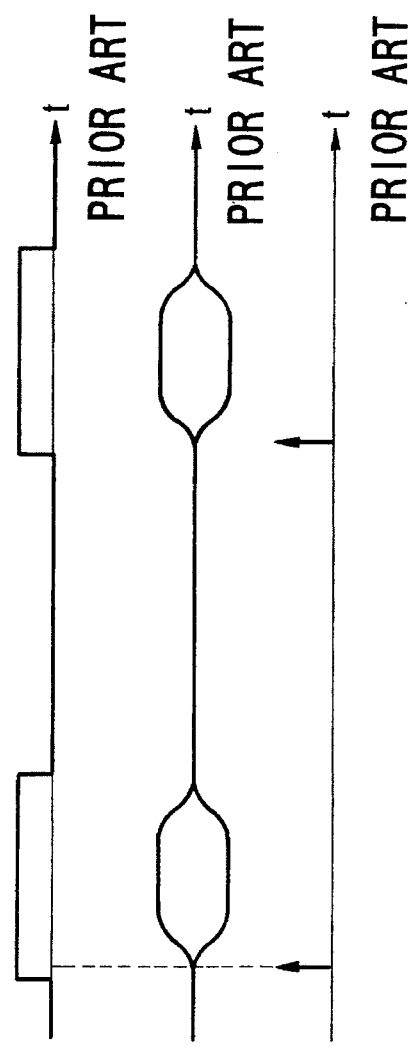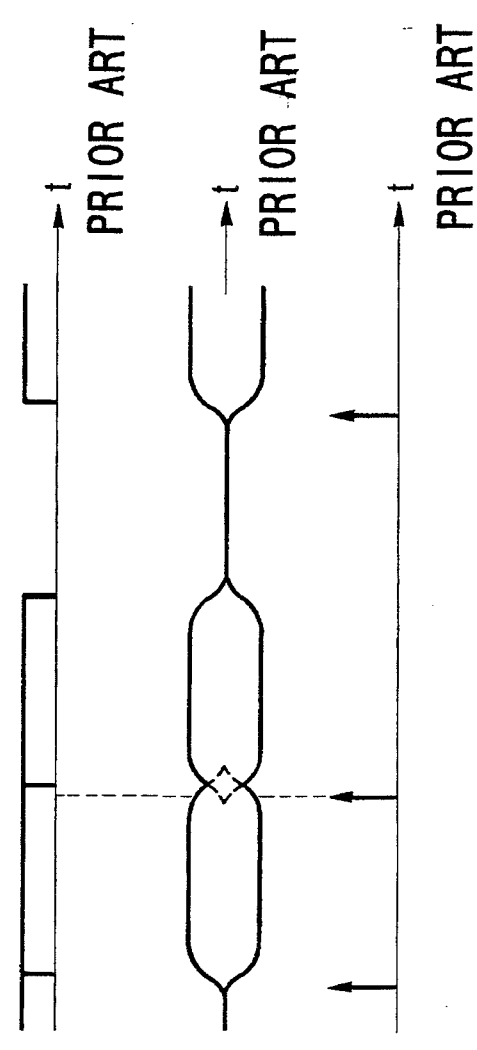

TIME-DIVISION MULTIPLEX COMMUNICATION TRANSMISSION APPARATUS

BACKGROUND OF THE INVENTION

The present invention relates to a radio transmission apparatus and, more particularly, to a radio transmission apparatus for transmitting a burst high-frequency signal which does not interfere with an adjacent channel in time-division multiplex communication.

A conventional radio transmission apparatus is constituted, e.g., by a logic processing unit 1, a modulation unit 2, and a high-frequency amplification unit 3, as shown in FIG. 10. The logic processing unit 1 includes a logic processing circuit 14 for performing differential conversion and the like, and a frequency divider 13 for frequency-dividing an input clock signal 12. The logic processing unit 1 receives input data 11 and the input clock signal 12 and outputs a differential conversion signal. Note that the input clock signal 12 is frequency-divided up to the speed of a data rate by the frequency divider 13. Assume, in this case, that the frequency division ratio is ⅛. The logic processing circuit 14 receives the input data 11 and a clock 17 obtained by frequency division and extracts a timing signal for each time slot when time-division transmission is performed. Note that this timing signal may be externally supplied. The timing signal is supplied, as a burst timing signal 15, to the high-frequency amplification unit 3 and the modulation unit 2 on the subsequent stage of the logic processing unit 1. The modulation unit 2 includes a digital filter 21 and a modulation circuit 22. The digital filter 21 receives a data signal 16 processed by the logic processing circuit 14 and performs waveform shaping of a transmission spectrum. For example, the digital filter 21 has a Gaussian filter function and serves to perform waveform shaping, e.g., conversion of an input data signal into a modulation signal for MSK (minimum shift keying). The burst timing signal 15 serves to reset the digital filter 21 at the start of each time slot so as to synchronize data in each time slot with a clock. The modulation circuit 22 modulates a carrier using an output signal from the digital filter 21 as a modulation signal. The high-frequency amplification unit 3 amplifies a modulated carrier 23 output from the modulation unit 2. In addition, in transmitting a signal for each time slot as a burst-like signal, the high-frequency amplification unit 3 performs waveform shaping to smooth the leading and trailing edges of the burst-like signal to prevent unnecessary spread of a spectrum when the signal rises and falls. The burst timing signal 15 is used for synchronization with this waveform shaping operation.

The waveform shaping operation will be described next with reference to FIGS. 11A to 11C. When the burst timing signal 15 is input with respect to the burst-like data signal 23 shown in FIG. 11A at the timing shown in FIG. 11C, a high-frequency output signal 24 is waveform-shaped to have smooth leading and trailing edges, as shown in FIG. 11B, thereby preventing unnecessary spread of a spectrum caused by abrupt changes in amplitudes at the leading and trailing edges of a transmission wave.

In this conventional radio transmission apparatus, a burst timing signal serves to reset not only the high-frequency amplification unit 3 but also the digital filter 21. If the digital filter 21 is reset, an output from the digital filter 21 exhibits discontinuity or an abrupt change at the time of the reset operation. As shown in FIG. 11C, when a reset point, i.e., the burst timing signal 15, is located before the leading edge of the high-frequency output signal 24, even if a discontinuous point appears at that time point and a spectrum spreads, the signal is not radiated from an antenna 4. Even if the signal is radiated, since the signal level is very low, an adjacent frequency channel is not influenced.

In a base station of an automobile telephone system, adjacent time slots may be used at once. This state is shown in FIGS. 12A to 12C. More specifically, as shown in FIG. 12A, since time slots A and B of the burst-like data signal 23 are continuously transmitted, the digital filter 21 is reset by the burst timing signal 15 at the boundary between the time slots A and B of the burst-like data signal 23 before the level of the high-frequency output signal 24 sufficiently decreases, as shown in FIG. 12C. The high-frequency signal 24 shown in FIG. 12B, whose spectrum is not smooth and unnecessary spreads owing to data discontinuity caused by this reset operation, is radiated from the antenna 4. For this reason, the radiated signal interferes with an adjacent frequency channel to make it difficult to perform proper communication.

SUMMARY OF THE INVENTION

It is an object of the present invention to provide a time-division multiplex radio transmission apparatus which can prevent unnecessary spread of the spectrum of a transmission wave at the boundary of adjacent time slots.

It is another object of the present invention to provide a time-division multiplex radio transmission apparatus which does not interfere with communication in an adjacent frequency channel.

In order to achieve the above objects, according to the present invention, there is provided a time-division multiplex communication transmission apparatus comprising logic processing means for performing logic processing of input burst data and outputting a burst timing signal for each time slot for time-division transmission, digital filter means for converting output data from the logic processing means into baseband data for modulation, the digital filter means being reset at a time slot boundary when no burst data signal is present in an adjacent time slot, modulation means for modulating an output signal from the digital filter means, and high-frequency amplification means for performing burst waveform processing of an output signal from the modulation means on the basis of a burst timing signal from the logic processing means.

BRIEF DESCRIPTION OF THE DRAWINGS

FIGS. 2A to 2C are timing charts showing the operation of the time-division multiplex radio transmission apparatus shown in FIG. 1;

FIG. 3 is a block diagram showing an embodiment of a logic processing circuit in FIG. 1;

FIG. 4 is a flow chart showing the operation of a continuous state detection circuit in FIG. 3;

FIGS. 8A to 8D are timing charts showing input and output waveforms to and from the digital filter;

FIGS. 9A to 9D are timing charts showing the relationship between an input data signal and input and output clocks to and from a second frequency divider;

FIG. 11 is a timing chart showing a case wherein time slots are not continuously used; and FIG. 12 is a timing chart showing a case wherein time slots are continuously used.

DESCRIPTION OF THE PREFERRED EMBODIMENT

Figure 1:
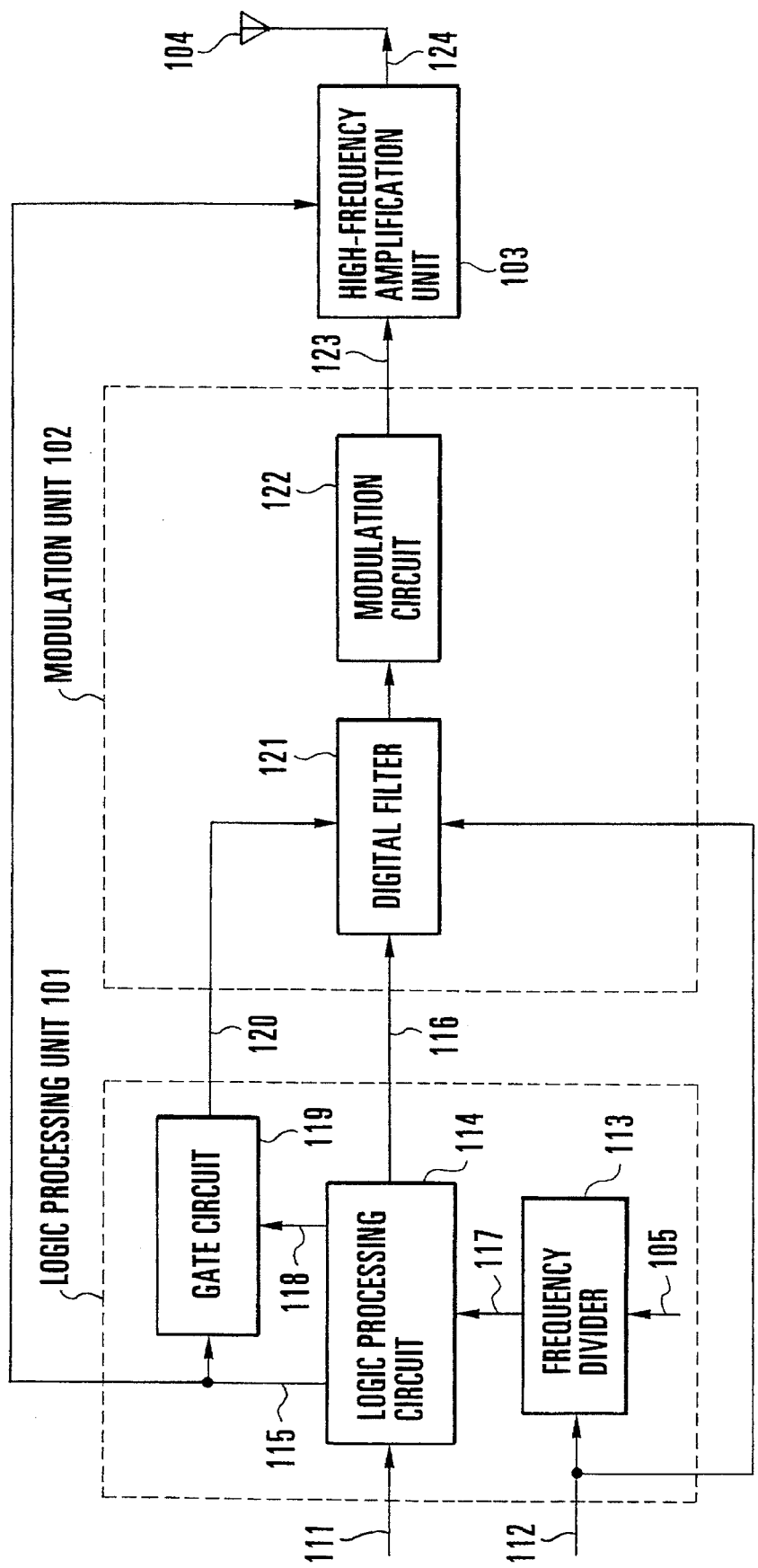
FIG. 1 is a block diagram showing a time-division multiplex radio transmission apparatus according to an embodiment of the present invention.

The present invention will be described below with reference to the accompanying drawings. FIG. 1 shows a time-division multiplex radio apparatus according to an embodiment of the present invention. Referring to FIG. 1, the time-division multiplex radio apparatus is constituted by three blocks, i.e., a logic processing unit 101, a modulation unit 102, and a high-frequency amplification unit 103. The logic processing unit 101 comprises: a logic processing circuit 114 for performing logic processing such as differential conversion with respect to a data signal 111 input to the apparatus and extracting a burst timing signal 115 in each time slot and a burst continuous state signal 118 representing the continuous input state of the data signal 111; a frequency divider 113 for outputting, to the logic processing unit 101, a frequency-divided clock 117 obtained by frequency-dividing an input clock signal 112 in synchronism with the period of the data signal 111 to have the same speed as that of the data signal 111; and a gate circuit 119 for controlling the burst timing signal 115 on the basis of the burst continuous state signal 118 to generate a digital filter reset signal 120. For example, the frequency divider 113 is reset once by a reset signal 105 at the start of transmission to synchronize with the period of a data signal. The modulation unit 102 includes a digital filter 121 and a modulation circuit 122. The digital filter 121 serves to convert a data signal 116 into a baseband signal for modulation. For example, the digital filter 121 has the function of a Gaussian filter and converts the data signal into an MSK baseband signal or the like. The modulation circuit 122 constitutes, e.g., a quadrature modulator and includes a frequency converter for performing conversion to a high-frequency band. The high-frequency amplification unit 103 amplifies a modulated carrier 123 to a level at which an amplified output 124 can be radiated from an antenna 104. Furthermore, in this case, waveform shaping of an envelope is performed so that a burst-like transmission signal can smoothly rise and fall. This operation is performed to prevent unnecessary spread of a spectrum which is caused by an abrupt change in amplitude.

Figure 10:
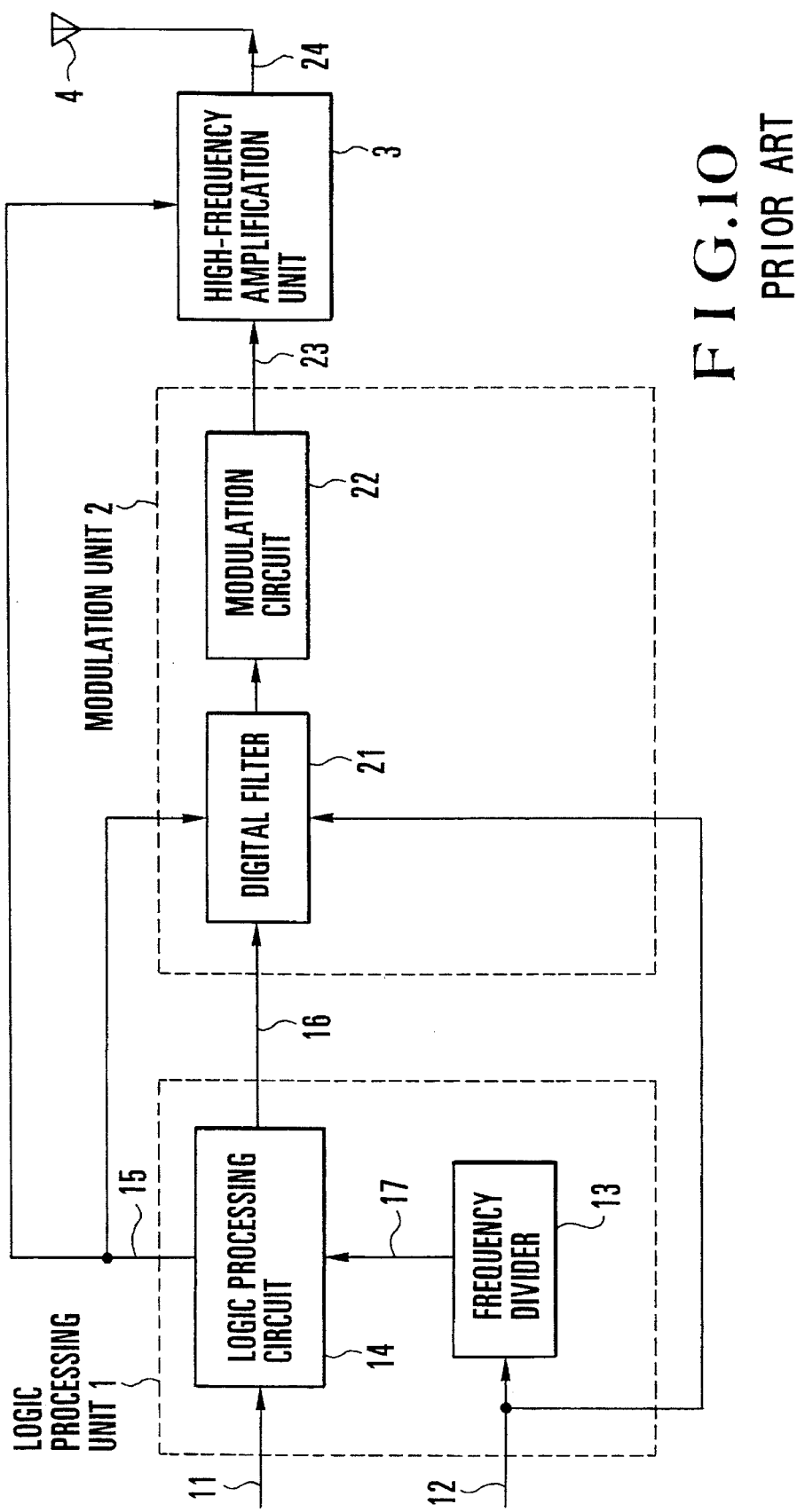
FIG. 10 is a block diagram showing a conventional time-division multiplex radio transmission apparatus.

That is, in this embodiment, the gate circuit 119 is added to the prior art shown in FIG. 10 so that the timing signal 115 is supplied to the digital filter 121 of the modulation unit 102 after the signal is made to pass through the controlled gate circuit 119.

Figure 5:
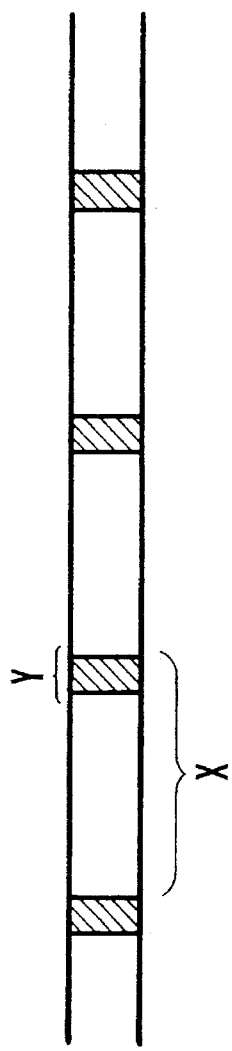
FIG. 5 is a view for explaining the format of an input data signal.

FIG. 3 shows an example of the logic processing circuit 114 shown in FIG. 1. Referring to FIG. 3, input data 111 input to a timing extraction circuit 126 is transmitted with a format like the one shown in FIG. 5. More specifically, the input data is transmitted in units of bursts X (each consisting of, e.g., 512 bits). Since the data is continuously transmitted, a known specific pattern (e.g., "101010 . . ."; 32 bits) Y is attached, as a delimiter, to the head of each burst.

Figure 6:
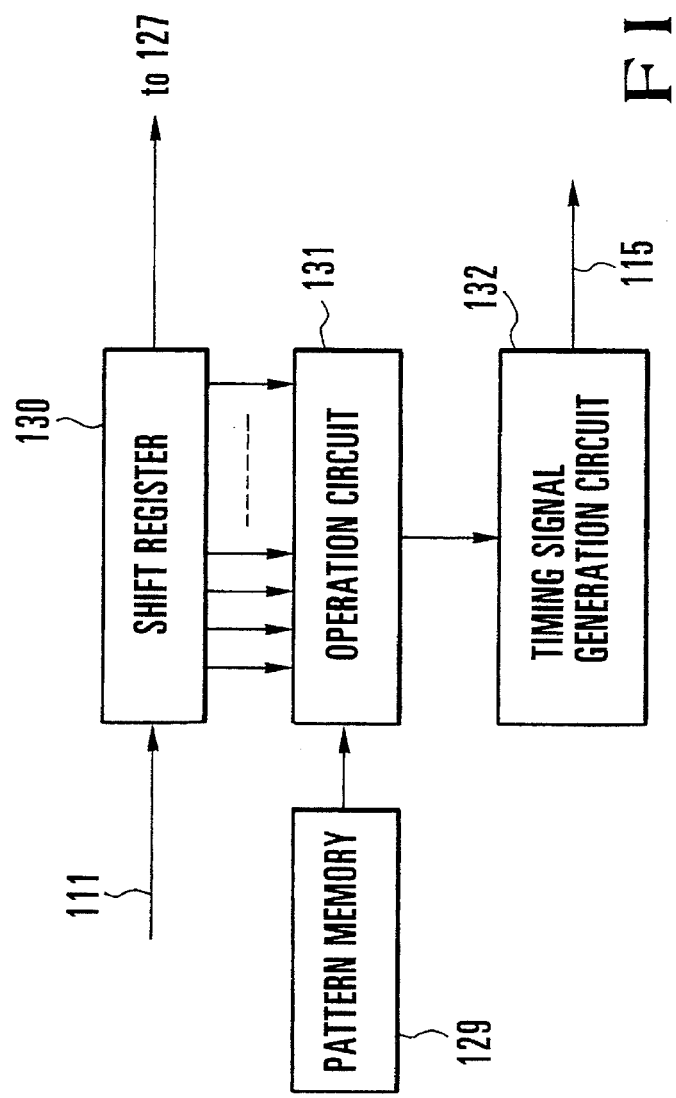
FIG. 6 is a block diagram showing an example of a timing extraction circuit in FIG. 3.

The timing extraction circuit 126 is arranged, for example, as shown in FIG. 6. In this arrangement, an output from a pattern memory 129, in which a known specific pattern is stored, and parallel outputs from a shift register 130, which serially receives the input data 111, are subjected to comparison processing in an operation circuit 131 (for example, when patterns coincide with each other, all the addition results obtained by binary notation become "0"s.) If the specific pattern is detected, the burst timing signal 115 is generated by a timing signal generation circuit 132.

An adder 127 serves to facilitate demodulation at the time of demodulation on the reception side. More specifically, the adder 127 sequentially calculates the sums of the first and second values, the second and third values, . . . , of input data in binary notation. The resultant data is set as output data of the adder 127.

A continuous state detection circuit 128 serves to detect whether bursts are continuously transmitted. The continuous state detection circuit 128 detects the presence/absence of an input pulse as input data shown in FIG. 4A, and changes the burst continuous state signal.

For example, this operation can be realized by using a re-trigger type monostable multivibrator (one-shot vibrator). This monostable multivibrator is designed to output a pulse having a predetermined width at the leading edge of an input pulse as a start point, as shown in FIG. 4B. The width of this pulse is determined by a time constant t of the monostable multivibrator.

If a time during which the absence of input data is determined (e.g., a length ½ or less one burst) corresponds to the time constant t, the burst continuous state signal 118 changes from H level to L level after the lapse of the time t, during which the circuit is not re-triggered, since the last pulse arrives, as shown in FIG. 4C. By designing the circuit such that the digital filter reset signal 120 is not output from the gate circuit 119 when the burst continuous state signal 118 is at H level, inhibition of passage of a reset signal in the present invention can be realized. That is, when an adjacent time slot is continuously used, the burst continuous state signal 118 is kept at H level to inhibit the burst timing signal 115 from passing through the gate circuit 119.

Figure 7:
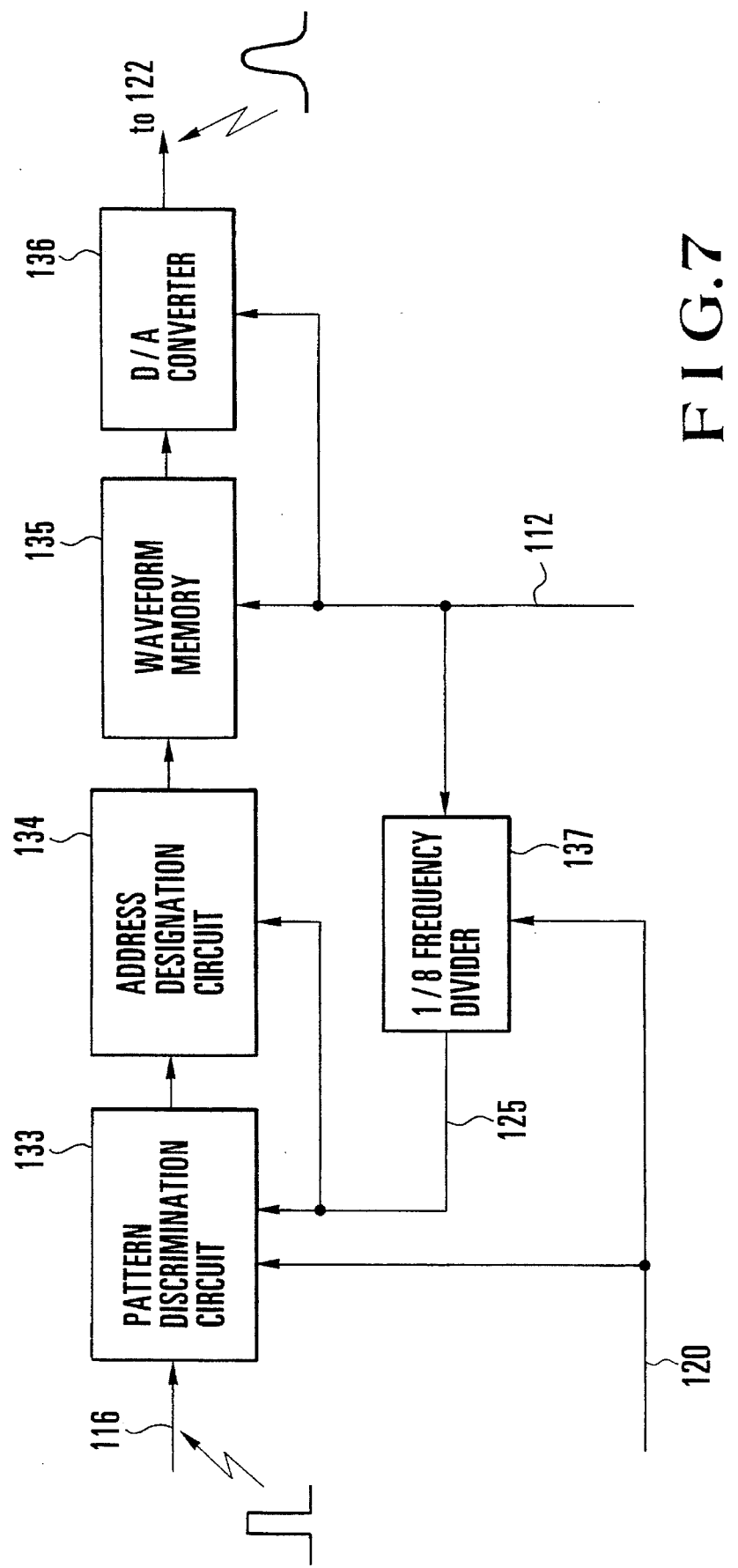
FIG. 7 is a block diagram showing an example of a digital filter in FIG. 1.

FIG. 7 shows an example of the digital filter 121 shown in FIG. 1. The digital filter 121 serves to moderate an abrupt change of a digital signal as a rectangular wave. Different analog waveforms are output from the digital filter 121, in units of bits, depending on patterns before and after an input signal.

A pattern discrimination circuit 133 discriminates the pattern of the input signal 116. A timing signal generation circuit 132 designates an address of a waveform memory 135, in which output waveforms are stored, in accordance with the discrimination output from the pattern discrimination circuit 133. The waveform memory 135 is a digital memory and hence outputs a digital signal corresponding to the address-designated waveform. When this signal is converted into an analog signal by a D/A converter 136, a desired waveform can be obtained.

Since the D/A converter 136 and the waveform memory 135 handle data obtained by subdividing analog waveforms, they require the clock signal 112 faster (eight times, in this case) than a normal clock.

In contrast to this, since the pattern discrimination circuit 133 is only required to perform comparison/discrimination in units of bits of signals, it may use a clock signal having the same speed as that of input data from a ⅛ frequency divider 137. A clock signal from the ⅛ frequency divider 137 is also output to an address designation circuit 134.

The operation of the time-division multiplex communication radio transmission apparatus having the above-described arrangement will be described next with reference to FIGS. 1 and 2A to 2C. When the input data signal 111 is input to the logic processing circuit 114 of the logic processing unit 101, the logic processing circuit 114 performs logic processing on the basis of a clock signal from the frequency divider 113 in synchronism with the period of the input data, and outputs the logically processed data to the modulation unit 102. At the same time., the logic processing circuit 114 outputs the burst timing signal 115 in synchronism with a time slot. Upon reception of the logically processed data from the logic processing circuit 114, the digital filter 121 of the modulation unit 102 converts the data into a modulation baseband signal on the basis of the clock signal 112. At this time, as indicated by a time slot C in FIG. 2A, if no input data is present in the adjacent time slot, the burst continuous state signal from the logic processing circuit 114 is set at L level, and the burst timing signal 115 passes through the gate circuit 119. With this operation, the gate circuit 119 outputs the burst timing signal 115, which has passed therethrough, as the digital filter reset signal 120 (signals R1 and R3 in FIG. 2C), to the digital filter 121. As a result, the digital filter 121 is reset for every time slot.

In contrast to this, if input data are present in adjacent time slots, as indicated by time slots A and B in FIG. 2A, the burst continuous state signal from the logic processing circuit 114 is set at H level to inhibit the burst timing signal 115 from passing through the gate circuit 119 (signal R2 in FIG. 2C). With this operation, the digital filter reset signal 120 is not output from the gate circuit 119 to the digital filter 121, and a smooth waveform can be obtained at the boundary of the time slots, as shown in FIG. 2B. The baseband signal from the digital filter 121 undergoes quadrature modulation in the modulation circuit 122. Thereafter, waveform shaping of the envelope is performed by the high-frequency amplification unit 103 such that a burst-like transmission signal gradually rises and falls. The resultant signal is then radiated from the antenna 104. At this time, the high-frequency amplification unit 103 is reset by the burst timing signal 115 from the logic processing circuit 114 at the start of each time slot.

In order to allow the digital filter 121 to properly operate, it is required that data and a clock signal be synchronized with each other in time slots A, B, and C of a burst data signal in FIG. 2A. Therefore, the digital filter 121 is reset by using the burst timing signal 115 to establish synchronization. Note that this synchronization is not lost once it is established. For this reason, the digital filter 121 is not reset for every time slot. Timing synchronization can be established by resetting the digital filter 121 at least once only when time slots are not continuously used.

This operation will be described below with reference to FIGS. 8A to 8D and 9A to 9D.

Both the logic processing unit 101 and the modulation unit 102 use clock signals. However, the modulation unit 102 uses a clock signal (X8 clock signal) eight times faster than the clock signal used by the logic processing unit 101 because of the digital filter 121. For this reason, as described above, the X8 clock signal is frequency-divided to generate required clock signals.

If, however, the logic processing unit 101 and the modulation unit 102 independently perform frequency division of the X8 clock signal, the two resultant clock signals may have opposite phases, as shown in FIGS. 9C and 9D. In this case, if a clock signal from the ⅛ frequency divider 137 has the phase shown in FIG. 9C, the leading edge of the input data signal 116 in FIG. 8A coincides with a rest point, and the output waveform becomes continuous, as shown in FIG. 8B. In contrast to this, if the clock signal has the phase shown in FIG. 9D, the above-mentioned coincidence is not achieved.

With the phase of the clock signal shown in FIG. 9D, the input data signal 116 in the digital filter 121 is reset at a position other than a proper bit boundary, as shown in FIG. 8C. As a result, a discontinuous point appears in the output waveform, as shown in FIG. 8D. If such a discontinuous point appears during transmission of an electric wave from the transmission apparatus, unnecessary spread of a spectrum occurs.

According to the present invention, this unnecessary spread of a spectrum is prevented by not resetting the digital filter 121 during transmission, i.e., transmission of continuous burst data, without performing a specific phase matching operation with respect to the input data signal 116 from the digital filter 121 and a clock signal from the ⅛ frequency divider 137.

As has been described above, according to the present invention, the gate circuit is controlled such that the digital filter is reset only when time slots are not continuously used. For this reason, no discontinuous point appears in modulated data, and no unnecessary spread of a spectrum occurs. Therefore, adjacent channels are free from interference caused by an unnecessary spectrum.

What is claimed is:

1. A time-division multiplex communication transmission apparatus for transmitting a time-division multiplexed output signal having a plurality of time slots, comprising:

logic processing means for performing logic processing of input burst data and outputting a burst timing signal for each time slot of said time-division multiplexed output signal;

digital filter means for converting output data from said logic processing means into baseband data for modulation, said digital filter means being reset at a time slot boundary when no burst data signal is present in a preceding adjacent time slot;

modulation means for modulating an output signal from said digital filter means;

high-frequency amplification means for performing burst waveform processing of an output signal from said modulation means on the basis of a burst timing signal from said logic processing means and for outputting said time-division multiplexed signal; and continuous state detection means for detecting a continuous state of burst data in two adjacent, continuous time slots to output a burst continuous state signal, and gate means for allowing a burst timing signal from said logic processing means to pass therethrough to output a reset signal to said digital filter means when no burst continuous state signal from said continuous state detection means is input, and inhibiting passage of the burst timing signal to prevent a reset signal from being output when a burst continuous state signal is input.

2. An apparatus according to claim 1, wherein said continuous state detection means is constituted by a re-trigger type monostable multivibrator for outputting a pulse having a predetermined width in response to an input pulse.

3. An apparatus according to claim 1, wherein a period of a signal output from said continuous state detection means is not less than ½ that of burst data.

4. An apparatus according to claim 1, further comprising frequency-dividing means for frequency-dividing an external clock in synchronism with a period of burst data and outputting a frequency-divided clock to said logic processing means.

5. An apparatus according to claim 4, wherein said frequency-dividing means is reset only once at the start of transmission of burst data.

6. An apparatus according to claim 1, wherein said logic processing means comprises a timing extraction circuit for detecting a specific data pattern attached to a head of burst data to output a burst timing signal, and an adder for performing addition processing of burst data.

7. A time-division multiplex communication transmission apparatus for transmitting a time-division multiplexed output signal having a plurality of time slots, comprising:

timing extraction means receiving input burst data for outputting a burst timing signal for each time slot of said time-division multiplexed output signal on the basis of said input burst data;

adder means for receiving said input burst data and for performing addition processing of said input burst data;

frequency-dividing means for outputting a frequency-divided clock, obtained by frequency-dividing an external clock in synchronism with a period of said input burst data, to said adder means and said timing extraction means;

continuous state detection means for outputting a burst continuous state signal upon detecting a continuous state of said input burst data in two adjacent, continuous time slots on the basis of said input burst data;

digital filter means for converting output data from said adder means into baseband data for modulation, said digital filter means being reset by a reset signal;

modulation means for modulating an output signal from said digital filter means;

high-frequency amplification means for performing burst waveform processing of an output signal from said modulation means on the basis of a burst timing signal from said timing extraction means and for outputting said time division multiplexed output signal; and gate means for allowing a burst timing signal from said timing extraction means to pass therethrough to output a reset signal to said digital filter means when no burst continuous state signal is inputted from said continuous state detection means, and inhibiting passage of the burst timing signal to prevent the reset signal from being outputted when a burst continuous state signal is inputted.

* * * * *